(12) United States Patent
Ebizuka et al.

(10) Patent No.: US 6,469,846 B2
(45) Date of Patent: Oct. 22, 2002

(54) GRISM

(75) Inventors: Noboru Ebizuka, Yokohama; Masanori Iye, Tokyo; Koji Sugioka; Toshikazu Ebisuzaki, both of Wako, all of (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/893,885

(22) Filed: Jun. 29, 2001

(65) Prior Publication Data

US 2002/0008921 A1 Jan. 24, 2002

(30) Foreign Application Priority Data

Jun. 29, 2000 (JP) .......................................... 2000-195384

(51) Int. Cl.[7] ................................................. G02B 5/04
(52) U.S. Cl. ........................ 359/837; 359/831; 359/833; 359/832
(58) Field of Search ................................. 359/837, 831, 359/833, 832, 558; 250/226, 208.1, 234, 201.2, 201.4; 356/310, 326, 328, 375, 376

(56) References Cited

U.S. PATENT DOCUMENTS

| | | | | | |
|---|---|---|---|---|---|
| 4,917,461 | A | * | 4/1990 | Goldstein | 350/286 |
| 5,625,499 | A | * | 4/1997 | Chen | 359/831 |
| 5,668,919 | A | * | 9/1997 | Ito | 396/268 |
| 6,166,373 | A | * | 12/2000 | Mao | 250/226 |

* cited by examiner

*Primary Examiner*—Mohammad Sikder
(74) *Attorney, Agent, or Firm*—Birch, Stewart, Kolasch & Birch, LLP

(57) ABSTRACT

In order to provide a grism wherein even if the vertex angle of a prism increases, it does not exceed its critical angle, besides, which can elevate its efficiency, and mass-production of which is possible, whereby reduction in cost of which can be realized. The grism comprises a first prism having a high refractive index, a second prism having a high refractive index, and a volume phase grating used for a diffraction grating; and the vertex angle of the first prism being opposed to the vertex angle of the second prism so as to sandwich the volume phase grating between the first prism and the second prism.

6 Claims, 1 Drawing Sheet

GRISM

BACKGROUND OF THE INVENTION

1. Field of the Invention

The present invention relates to a grism, and more particularly to a grism used suitably for monitoring and/or inspections apparatuses in a factory and the like for scientific observation.

It is to be noted herein that "grism" is a transmission type direct vision dispersive element prepared by combining prisms with a grating so as to allow a light beam having an arbitrary order and an arbitrary wavelength to go straight.

2. Description of the Related Art

In recent years, a number of instruments for astronomical observation having both functions of imaging and spectroscopic function have been developed with progress of two-dimensional detectors. In such an instrument, grisms are used for a dispersive element.

In this case, a so-called high dispersive grism provided with a replica grating has been proposed as a diffraction grating. In such grism, since a refractive index of a resin being a material for preparing a replica grating is around 1.5, there has been such a problem that high resolving power cannot be attained because a light beam exceeds its critical angle in the case where a prism to which is attached the replica grating has a refractive index of, for example, around 2.3, even if the vertex angle of the prism is around 40°.

Furthermore, the above-described high dispersive grism provided with a replica grating may be used within a range where a light beam does not exceed the critical angle, as a matter of course, but there has been a problem of disadvantage in efficiency.

In this respect, if a diffraction grating can be directly processed and formed on a surface of a prism, high efficiency can be achieved. However, there has been such a problem that it is difficult to directly process a diffraction grating having a depth of 1 μm or more on a surface of a prism. Moreover, mass-production is difficult, whereby a grism produced by means of a direct process becomes expensive.

3. Object and Summary of the Invention

The present invention has been made in view of the above-described problems involved in the prior art, and an object of the invention is to provide a grism wherein a light beam does not exceed its critical angle even if the vertex angle of a prism is made to increase, its efficiency can be elevated, besides, mass-production thereof can be made, and a low cost therefor can be realized.

In order to achieve the above-described object, a grism according to the present invention is constituted by combining prisms each prepared from a material having a high refractive index with a volume phase grating (Volume Phase Grating: VPG).

Namely, a grism according to the present invention comprises a first prism having a high refractive index, a second prism having a high refractive index, and a volume phase grating used for a diffraction grating; the vertex angle of the above-described first prism being opposed to the vertex angle of the above-described second prism so as to sandwich the above-described volume phase grating between the first prism and the second prism; a light beam being input from the outside through a surface of the above-described first prism; the light beam input inside the first prism being input into the above-described second prism through the above-described volume phase grating; and the light beam input a inside the second prism being output to the outside through a surface of the second prism.

Furthermore, the grism according to the present invention is characterized in that a refractive index of the above-described first and second prism are higher than a refractive index of the volume phase grating.

Moreover, the grism according to the present invention is characterized in that a material for preparing the above-described first prism is either of zinc sulfide and lithium niobate; a material for preparing the above-described second prism is either of zinc sulfide and lithium niobate; and a material for preparing the above-described volume phase grating is bicromate gelatin.

Besides, the grism according to the present invention is characterized in that a sum of the vertex angle of the above-described first prism and the vertex angle of the above-described second prism is equal to or larger than a critical angle determined by a refractive index of the first prism and a refractive index of the volume phase grating.

BRIEF DESCRIPTION OF THE DRAWING

The present invention will become more fully understood from the detailed description given hereinafter and the accompanying drawing which is given by way of illustration only, and thus is not limitative of the present invention, and wherein.

DETAILED DESCRIPTION OF THE PREFERRED EMBODIMENTS

Figure 1:
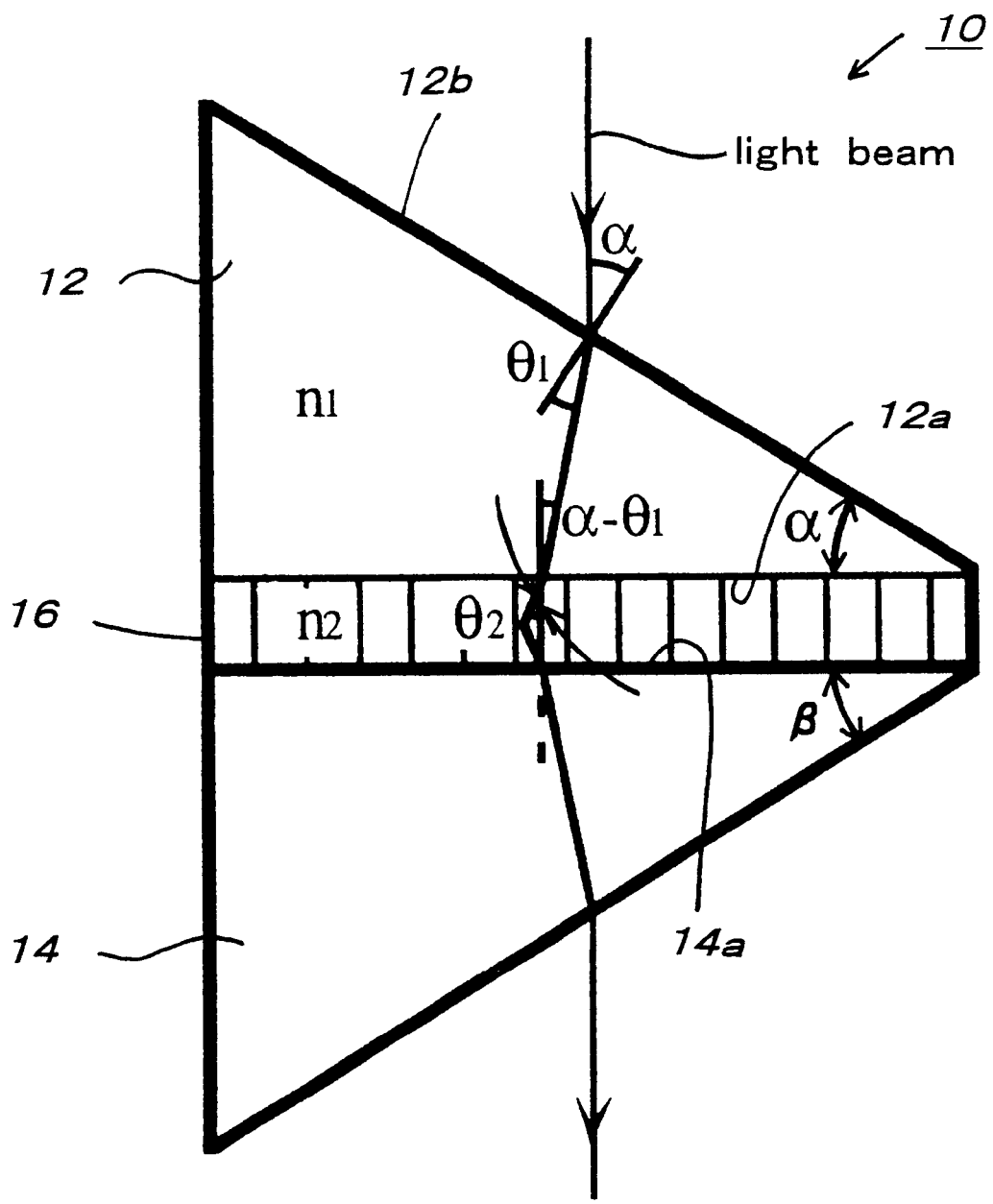
FIG. 1 is a conceptual, constitutional, explanatory diagram showing a grism according to the present invention.

An example of a preferred embodiment of a grism according to the present invention will be described in detail hereinafter by referring to the accompanying drawing.

FIG. 1 is a conceptual, constitutional, explanatory diagram showing a grism according to the present invention wherein the grism 10 is constituted in such that a volume phase grating 16 used as a diffraction grating is sandwiched between a first prism 12 having a high refractive index and a second prism 14 having a high refractive index 14.

In this case, an example of materials for preparing the high refractive index first prism 12 and the high refractive index second prism 14 includes dielectrics or semiconductors such as zinc sulfide (ZnS) and lithium niobate (LiNbO$_3$), and refractive indices thereof are a high refractive index of around 2.3.

In the present preferred embodiment, the first prism 12 and the second prism 14 are to be prepared from the same material.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Furthermore, a resin, for example, bicromate gelatin or the like may be used for a material from which the volume phase grating 16 is to be prepared. A refractive index of the bicromate gelatin is a smaller refractive index of around 1.5 than that of around 2.3 of zinc sulfide and lithium niobate.

In this respect, zinc sulfide, lithium niobate, and bicromate gelatin are transparent with respect to a light beam having a wavelength within a visible range. Accordingly, the grism 10 wherein bicromate gelatin is used as a material for preparing the volume phase grating 16 in addition to application of zinc sulfide and lithium niobate for preparing the first prism 12 and the second prism 14, respectively, can be employed for dispersing visible light.

In the following, the grism 10 shown in FIG. 1 will be described in more detail wherein a side 12a, defining right angle (90') with respect to the bottom of a right angled triangle, of the first prism 12 the cross section of which exhibits the above-described right angled triangle is opposed to a side 14a, defining right angle with respect to the bottom of a right angled triangle, of the second prism 14 the cross section of which exhibits the above-described right angled triangle. In this arrangement, the volume phase grating 16 is further sandwiched between the first and second prisms 12 and 14 in such that the vertex angle α of the first prism 12 is opposed to the vertex angle β of the second prism 14.

In the grism 10, a light beam is input from the outside through a surface of the first prism 12, the light beam thus input to the first prism 12 is input to the second prism 14 through the volume phase grating 16, and the light beam thus input to the second prism 14 is output to the outside through a surface of the second prism 14.

When it is assumed that a refractive index of the first prism 12 is "$n_1$" and a refractive index of the volume phase grating 16 is "$n_2$", a critical angle of the vertex angle a of the first prism 12 can be determined as follows.

Namely, in FIG. 1, an expression of refraction in a plane of incidence 12b of a light beam in the first prism 12 as well as an expression of refraction in an interface defined between the first prism 12 and the volume phase grating 16 correspond to the following expressions (1) and (2), respectively.

$$\sin \alpha = n_1 \sin \theta_1 \quad (1)$$

$$n_1 \sin(\alpha - \theta_1) = n_2 \sin \theta_2 \quad (2)$$

wherein when "$\alpha - \theta_1$" is a critical angle, $\theta_2$ is 90°, that is, sin $\theta_2$ is 1.0, so that it results in:

$$\sin (\alpha - \theta_1) = n_2/n_1 \quad (3)$$

When the above-described expression (3) is substituted by the expression (1), an expression (4) as to the vertex angle a is obtained:

$$\alpha - \sin^{-1}(\sin \alpha/n_1) = \sin^{-1}(n_2/n_1) \quad (4)$$

Based on the expression (4), a critical angle of the vertex angle α of the first prism 12 is represented.

Concerning the vertex angle β, a critical angle thereof can be also determined in accordance with the same manner as that described above.

It is to be noted that the vertex angle α is defined at the same angle as that of the vertex angle β in this grism 10.

Under the circumstances, when it is arranged in such that "$n_1 = 2.3$" and "$n_2 = 1.5$", such a large value of "α=63.6°", can be obtained as a critical angle of the vertex angle α of the first prism 12 from the above-described expression (4).

Since a critical angle defined between $n_1$ and $n_2$ is 40.7°, an optical path difference between the present grism 10 and a conventional grism with a replica grating is as follows:

$$2 \tan(63.6)/\tan(40.7) = 4.7.$$

Namely, about 4.7 times higher resolving power than that of a conventional grism can be obtained by the present grism 10.

As described above, a critical angle of 40.7° or more defined between $n_1$ and $n_2$ can be obtained with respect to only the vertex angle α of the first prism 12. Besides, there is also the vertex angle β of the second prism 14 in the grism 10, and accordingly, an angle obtained by adding the vertex angle α to the vertex angle β (a sum of the vertex angle α and the vertex angle β) exceeds easily the critical angle of 40.7° or more defined between $n_1$ and $n_2$.

More specifically, according to the grism 10 of the present invention, lithium niobate is used as a material for the first prism 12 and bicromate gelatin is further used as a material for the volume phase grating 16, whereby even if the vertex angle α is made to be 40° or more, it results in an angle which does not exceed its critical angle in the case when such condition that "$n_1=2.3$" and "$n_2=1.5$" is satisfied.

As explained as above, since it is possible that an angle obtained from at least a sum of the vertex angle α and the vertex angle β is made to exceed a critical angle defined by $n_1$ and $n_2$, the grism 10 according to the present invention can achieve positively a higher resolving power than that of a conventional grism.

Therefore, according to the present invention, a grism 10 having a high resolving power and a high efficiency can be realized.

Furthermore, according to the grism 10 of the present invention, it is possible as described above that a higher vertex angle than that of a conventional grism with a replica grating is established, so that the whole grism can be downsized in the present invention.

Besides, the grism 10 according to the present invention is easily mass-produced as compared with a directly processed grism, which is prepared by working directly a diffraction grating with respect to a prism by means of ion etching or the like manner, so that a manufacturing cost therefor can be significantly reduced.

The above-described preferred embodiment maybe modified into the following paragraphs (1) through (6).

(1) Although zinc sulfide and lithium niobate have been used for the materials of the first prism 12 and the second prism 14 in the above-described preferred embodiment, the invention is not limited thereto as a matter of course, but a material, which is transparent with respect to a wavelength of a light beam that is intended to permeate a grism and which has a high refractive index (for example, it is around 1.5 to 4) maybe appropriately employed. For instance, if a light beam having a wavelength within infrared region is intended to permeate the grism, gallium arsenide (GaAs), silicon and germanium they are transparent materials with respect to a light beam within infrared region and have a high refractive indices, or the like material may be used. In this case, gallium arsenide (GaAs) and silicon have refractive indices of around 3.5, germanium has a refractive index of around 4.0.

(2) While the first prism 12 and the second prism 14 have been prepared from the same material with each other in the above-described preferred embodiment, the invention is not limited thereto as a matter of course, but the first prism 12 and the second prism 14 may be prepared from different materials from one another. In this case, a refractive index of the first prism 12 may differ from that of the second prism 14.

(3) Although a resin such as bicromate gelatin has been used for a material of the volume phase grating 16 in the above-described preferred embodiment, the invention is not limited thereto as a matter of course. More specifically, it is sufficient that the volume phase grating 16 has a smaller refractive index than that of at least one of the first prism 12 and the second prism 14 in the present invention. Accordingly, a transparent material with respect to a wavelength of a light beam, which is intended to permeate a grism in addition to have such refractive index as described above may be appropriately employed.

(4) While the vertex angle α of the first prism 12 has been the same as the vertex angle β of the second prism 14 in the above-described preferred embodiment, the invention is not limited thereto as a matter of course, but the vertex angle α of the first prism 12 may differ from the vertex angle β of the second prism 14.

(5) Although each cross section of the first prism 12 and the second prism 14 has been defined in a right angled triangle in the above-described preferred embodiment, the invention is not limited thereto, but each cross section of the first prism 12 and the second prism 14 maybe defined in an appropriate configuration.

(6) The above-described preferred embodiment as well as the modifications described in the above paragraphs (1) through (5) may be appropriately combined with each other Since the present invention has been constituted as described above, it has such an excellent advantage to provide a grism wherein even if the vertex angle of a prism increases, it does not exceed its critical angle, and its efficiency can be improved, besides it is possible to mass-produce such grism as described above and to realize reduction of its manufacturing cost.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-195384 filed on Jun. 29, 2000 including specification, claims, drawing and summary are incorporated herein by reference in its entirety.

What is claimed is:

1. A grism comprising:

a first prism having a high refractive index;

a second prism having a high refractive index; and a volume phase grating used for a diffraction grating; the vertex angle of said first prism being opposed to the vertex angle of said second prism so as to sandwich said volume phase grating between said first prism and said second prism; a refractive index of said volume phase grating is smaller than that of at least one of said first prism and second prism; a light beam being input from the outside through a surface of said first prism; the light beam input inside said first prism being input into said second prism through said volume phase grating; and the light beam input inside said second prism being output to the outside through a surface of said second prism.

2. A grism as claimed in claim 1 wherein:

a refractive index of said first prism is 1.5 to 4;

a refractive index of said second prism is 1.5 to 4; and a refractive index of said volume phase grating is smaller than that of at least one of said first prism and said second prism.

3. A grism as claimed in claim 1 wherein:

a material for preparing said first prism is either of zinc sulfide and lithium niobate;

a material for preparing said second prism is either of zinc sulfide and lithium niobate; and a material for preparing said volume phase grating is bicromate gelatin.

4. A grism as claimed in claim 1 wherein:

a sum of the vertex angle of said first prism and the vertex angle of said second prism is equal to or larger than a critical angle determined by a refractive index of said first prism and a refractive index of said volume phase grating.

5. A grism as claimed in claim 2 wherein:

a sum of the vertex angle of said first prism and the vertex angle of said second prism is equal to or larger than a critical angle determined by a refractive index of said first prism and a refractive index of said volume phase grating.

6. A grism as claimed in claim 3 wherein:

a sum of the vertex angle of said first prism and the vertex angle of said second prism is equal to or larger than a critical angle determined by a refractive index of said first prism and a refractive index of said volume phase grating.

* * * * *